United States Patent [19]

Grabow et al.

[11] Patent Number: 5,444,742

[45] Date of Patent: Aug. 22, 1995

[54] SYSTEM FOR BIDIRECTIONAL DATA TRANSMISSION BETWEEN A PLURALITY OF STATIONARY UNITS AND A VEHICLE

[75] Inventors: Wilhelm Grabow, Nordstemmen; Friedrich-Wilhelm Bode, Apelern, both of Germany

[73] Assignee: Robert Bosch GmbH, Stuttgart, Germany

[21] Appl. No.: 54,687

[22] Filed: Apr. 28, 1993

[30] Foreign Application Priority Data

Apr. 28, 1992 [DE] Germany .................. 42 13 880.9

[51] Int. Cl.6 ............................................. H04B 7/02
[52] U.S. Cl. .................................. 375/267; 375/259; 340/904; 340/905
[58] Field of Search ............... 375/37, 38, 40, 45, 375/88; 340/904, 905, 988, 989, 991, 993

[56] References Cited

U.S. PATENT DOCUMENTS

| | | |
|---|---|---|
| 4,081,748 | 3/1978 | Batz ................................. 375/40 |
| 4,357,593 | 11/1982 | von Tomkewitsch . |
| 5,101,510 | 3/1992 | Duckeck et al. . |

FOREIGN PATENT DOCUMENTS

| | | |
|---|---|---|
| 0317181 | 5/1989 | European Pat. Off. . |
| 0368545 | 5/1990 | European Pat. Off. . |

OTHER PUBLICATIONS

G. Freiji, D. De Preter, R. Schuessler, "Technological Options for Vehicle-Beacon Communication" Sep. 1990, pp. 11–19.

Lothar Tschimpke "Mobile UKW–Empfang im bebautem Gebiet und Empfangsverbesserung durch Diversity," [Mobile FM reception in built-up areas and recep. improvement using diversity] in 579 *Rundfunktechnische Mitteilungen*, vol. 25 No. 1, pp. 16–20 (1981).

[Broadcast Technology News.

Automotive Electronics Journal, Jan. 29, 1990, p. 19.

Von Tomkewitsch, "Dynamic Route Guidance ... " IEEE Transactions on Vehicular Technology, vol. 40, No. 1, Feb. 1991, pp. 45–50.

Christopher O'Malley, "Electronics as Your Co-Pilot," *Popular Science*, Sep. 1991, pp. 66–69.

P. T. Blythe, "Advanced Telematics in Road Transport," Proceedings of the Drive Conference, Brussels, Belgium 1991 vol. 1, pp. 248–269; Elsevier for Commission of the Eur. Comm.

European Radiocommunications Committee, Report 3, Lisbon, Feb. '91.

*Primary Examiner*—Stephen Chin
*Assistant Examiner*—William Luther
*Attorney, Agent, or Firm*—Frishauf, Holtz, Goodman & Woodward

[57] ABSTRACT

A system is proposed for bidirectional electromagnetic transmission of data signals between at least two stationary units and one vehicle unit. The stationary units in the downlink mode synchronously transmit the data signals to the vehicle unit and have different carrier frequencies. In the uplink mode, the data signals are transmitted from the vehicle unit to the stationary units by the semipassive transponder principle. In the process, the data signals of the vehicle unit are frequency-modulated to the various carrier frequencies of the stationary units. This arrangement improves the reliability of bidirectional data transmission. A preferred application is data exchange for traffic control systems between stationary beacon units and moving vehicles.

10 Claims, 5 Drawing Sheets

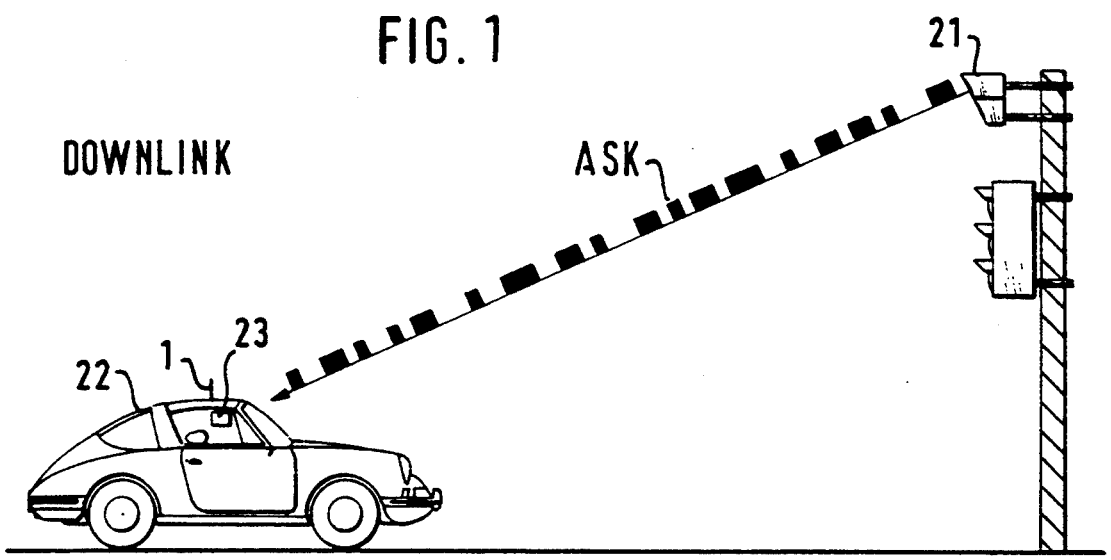
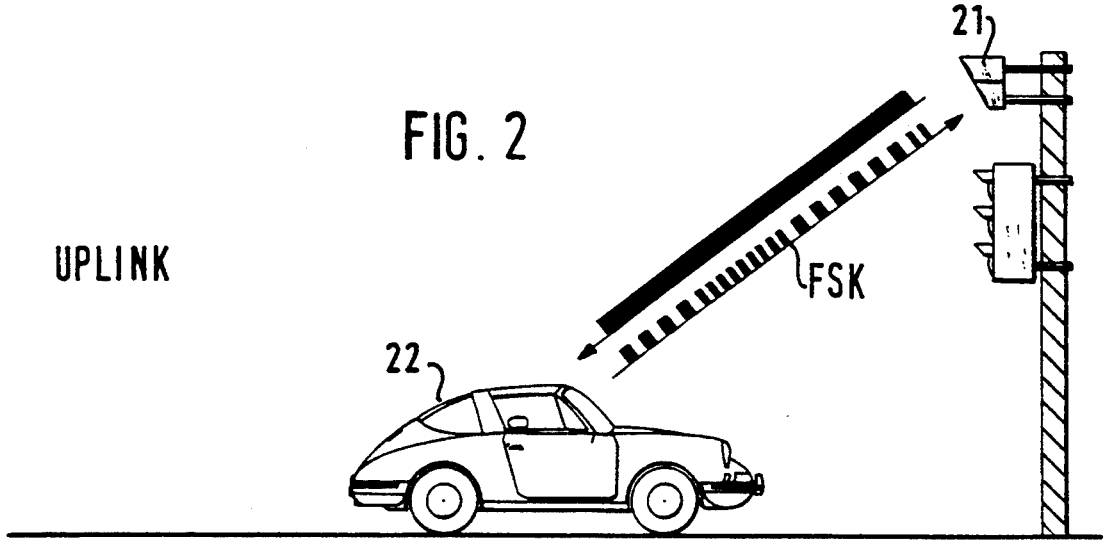

5,444,742

SYSTEM FOR BIDIRECTIONAL DATA TRANSMISSION BETWEEN A PLURALITY OF STATIONARY UNITS AND A VEHICLE

Cross-reference to related patents and applications, assigned to a subsidiary of the present assignee, the disclosures of which are hereby incorporated by reference:

U.S. Pat. No. 5,195,109, BOCHMANN et al., issued Mar. 16, 1993;
U.S. Pat. No. 4,939,791, BOCHMANN, issued Jul. 3, 1990;
U.S. Ser. No. 07/908,185, WIEDEMANN, filed Jul. 1, 1992;
U.S. Ser. No. 07/910,643, BOCHMANN, filed Jul. 8, 1992;
U.S. Ser. No. 07/935,848, WIEDEMANN et al., filed Aug. 26, 1992.

Cross reference to related application, assigned to the assignee of the present application:

DE-OS 40 39 887 (pub. June 1992) and corresponding PCT/DE 91/00926, filed Nov. 27, 1991, of which the U.S. national phase is U.S. Ser. No. 08/039,336, SIEGLE et al., filed Apr. 27, 1993 (RE docket R. 24037); German applications of Apr. 28, 1992: P 42 13 879, P 42 13 881 and P 42 13 882, and corresponding U.S. applications filed Apr. 28, 1993: 08/054,686; 08/054,685; and 08/054,688.

FIELD OF THE INVENTION

The invention relates generally to a system for bidirectional, electromagnetic transmission of data signals between a plurality of stationary units and a corresponding vehicle unit.

BACKGROUND

In the publication, Proceedings of the Drive Conference: "Advanced Telematics in Road Transport" Feb 4–6, 1991, Vol 1, it is proposed in the context of the PAMELA project that a data exchange be carried out in the microwave range with an active and semi-passive transponder. Data are transmitted from a beacon unit to the transmission and reception part of the vehicle unit in what is known as the downlink mode, by means of amplitude-modulated signals. The data transmission from the vehicle to the beacon is done in the uplink mode by the transponder principle. The beacon sends an unmodulated carrier signal, which is received by the vehicle unit. This received signal is frequency-modulated with the data to be transmitted and is received again by the beacon unit. Since the beacon units have only a short range within which reliable data transmission is possible, it is necessary especially on multiple-lane roads or at intersections to set up a plurality of beacons with corresponding transmitters. Yet there is then at least partial overlap in the areas illuminated by these beacons.

If the beacons, that is, the stationary units, were then to transmit at the same frequency, an interference field with highly location-dependent field intensities would be generated. Ground and vehicle reflections, however, also lead to major location-dependent changes in the reception power, however, so that overall the data transmission between the vehicle and the stationary unit and vice versa does not appear reliable enough.

SUMMARY OF THE INVENTION

The system of the invention has the advantage over the prior art that the field intensity is amplified because of the heterodyning of the synchronously transmitted data signals, so that a larger useful signal can be evaluated. Another advantage is that because of the different transmission frequencies of the stationary units, there is not such pronounced reduction or canceling out of the waves propagated from the reception site.

It is especially advantageous that the reception unit, formed as an antenna, is made by stripline technology. In this technology, an adequate bandwidth is possible with simple means.

The use of a detector diode for demodulating the antenna signal is especially simple and inexpensive. The signal obtained in this way is advantageously followed by a filter that has either low-pass or bandpass characteristics. The filter is selected such that the upper limit frequency is adapted to the maximum data rate to be transmitted and is less than the least difference between the carrier frequencies of the stationary units. Since each of the signals furnished by the individual stationary units contributes to increasing the signal-to-noise ratio, this improves the transmission reliability of the data signals.

In the uplink mode, the carrier signals transmitted by the stationary units are advantageously each modulated synchronously with the data signals to be transmitted and are then transmitted back to the stationary units. Each stationary unit receives only the signal modulated to its own carrier frequency. This is favorable for reliable data transmission, because it is unlikely that all the uplink connections will be interfered with simultaneously. Since the data signals received by the stationary units appear synchronously, they can also be compared with one another for content, so that errors in the transmission can readily be detected. Since the data signals are advantageously also transmitted by a predetermined protocol, comparison easily shows which of the data signals received were defective, so that they can be easily rejected. This increases the transmission reliability, so that the system can favorably be used to transmit traffic and navigation data or for dehiring roads use tolls.

Further advantages of the invention can be found in the following description.

DRAWINGS

An exemplary embodiment of the invention is shown in drawing and described in detail below.

FIG. 1 shows the transmission mode of a beacon (downlink mode);

FIG. 2 shows the transmission mode of a vehicle (uplink mode);

DETAILED DESCRIPTION

Figure 3:
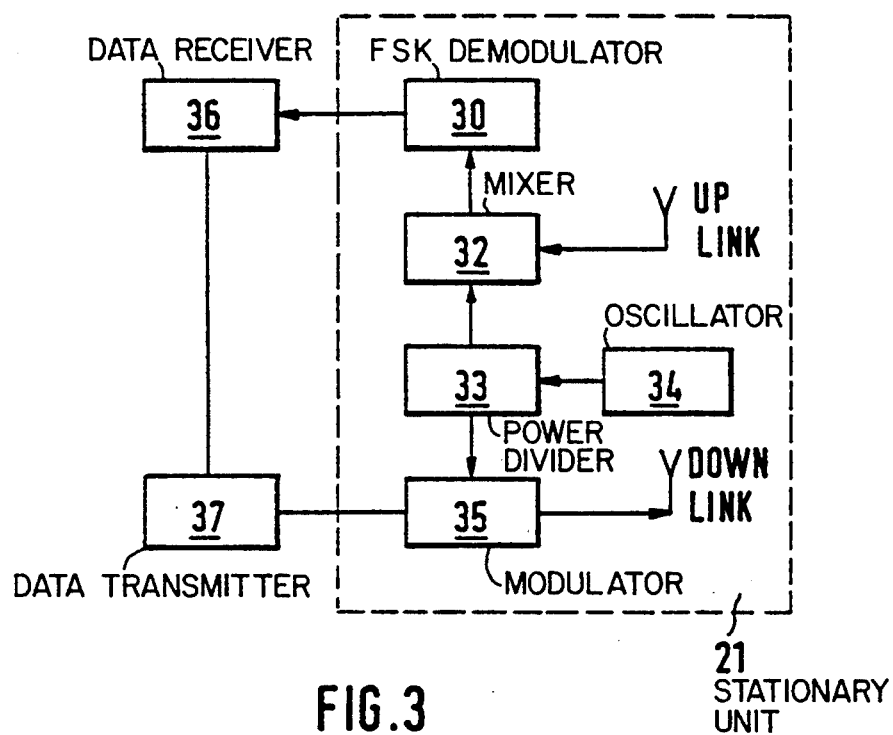
FIG. 3 is a block circuit diagram of the stationary unit.

FIG. 1 shows a vehicle 22, which has a vehicle unit 23 that is connected to an antenna 1 on the vehicle. From a stationary unit 21, for example a transceiver on a beacon, the vehicle receives amplitude-modulated signals ASK (for amplitude-shift-keying). The transmission mode from the beacon to the vehicle is called the downlink mode.

FIG. 2 shows the vehicle 22 in the uplink mode; that is, the vehicle unit 23 is now sending data signals to the beacon 21 by the semi-passive transponder principle. To that end, the beacon sends an unmodulated Carrier signal (CW signal). This signal is received by the antenna 1 of the vehicle unit 23 and modulated with a frequency-modulated signal (frequency-shift-keyed or FSK signal) that is dependent on the data signal to be transmitted. This is done for instance by changeover or modulation of the reflectance at the output of the antenna 1. The changeover of the reflectance can be effected in the simplest case by the diode used for receiving the demodulation. The signal modulated in this way is broadcast from the vehicle antenna 1 and received by the stationary unit 21. The semi-passive transponder process used is known per se from the aforementioned publication in the Proceedings of the Drive Conference.

Figure 4:
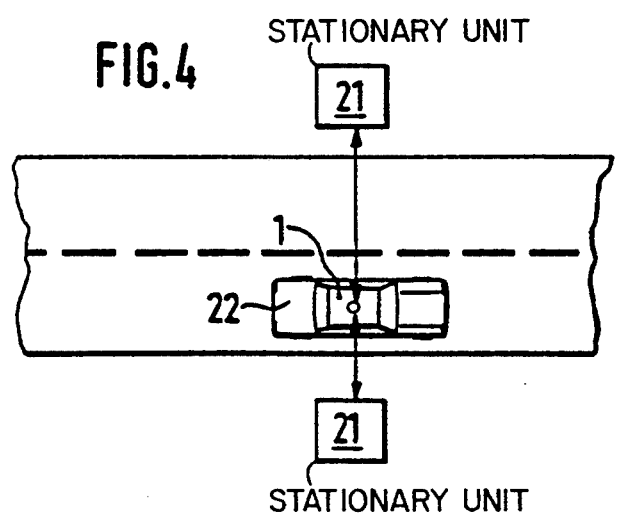
FIG. 4 shows an arrangement of two stationary units along a street.

In FIG. 4, two stationary units 21 are located at the edge of the road and transmit and receive by the method described above. By locating the two units 21 next to the roadway, the distances from the vehicle 22 differ, depending on the road width and on the lane in which the vehicle is driving. For instance, for a two-lane road, the distance from a vehicle can be 2 m or 6 m.

FIG. 3 is a block circuit diagram for a stationary unit, which is operated at a specific oscillator frequency, such as 5.8 GHz (GigaHertz). For this frequency range, two or more channels are available, each with a bandwidth of 5 MHz (MegaHertz). For the simplest case, two units 21 are used, as shown in FIG. 4. According to the invention, provision is made for using a greater number of units 21, which then operate at a predetermined fixed frequency spacing.

FIG. 3 is a block circuit diagram of a stationary unit 21. The stationary unit 21 operates by the time division multiplex process; that is, for one predetermined time period it transmits amplitude-modulated signals in the downlink mode, and then switches over to the uplink mode for the next time period. The mode of operation will now be described in conjunction with the block circuit diagram of FIG. 3, first for the downlink mode. A data transmitter 37, which contains the data to be transmitted to the vehicle, is connected to an ASK (amplitude-shift-keyed) modulator 35 for generating the amplitude-modulated transmission frequencies. The output of the modulator 35 is connected to a downline antenna, which by way of example operates at the carrier frequency of 5 GHz.

The oscillator 34, via a power divider 33, for instance a 3 dB divider, furnishes the carrier frequencies to modulator 35. In the uplink mode, a further antenna is connected to mixer 32. The mixer 32 is also connected to the power divider 33 and the oscillator 34. The mixer 32 is connected to an FSK demodulator 30, which delivers the uplink data to a data receiver 36. The data receiver 36 can decode the demodulated data and store it in memory or display it. The various component blocks of the block circuit diagram are known and therefore need not be described in detail. As already noted, the individual stationary units operate at different carrier frequencies, which are preferably adapted to standardized or authorized frequencies. The units 21, which cover the same area, preferably operate with a frequency spacing of 5 MHz, when there are three or four units for one area, so that the bandwidth to which the antenna of the vehicle unit 23 is tuned is then 20 MHz.

Figure 5:
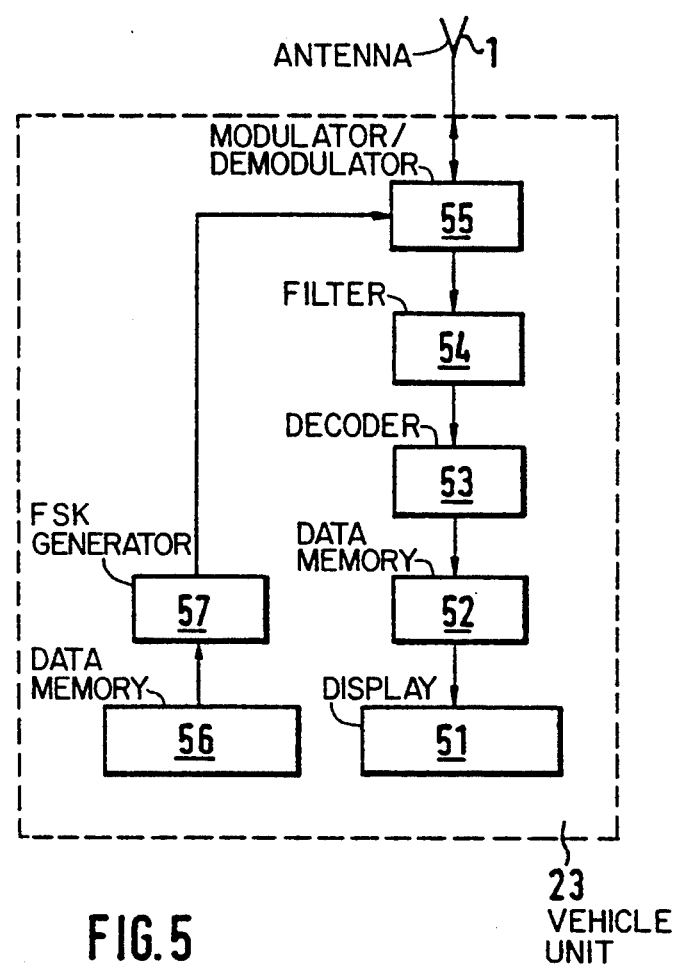
FIG. 5 is a block circuit diagram of a vehicle unit.

FIG. 5 shows a block circuit diagram of the vehicle unit 23. One antenna 1 is connected to a demodulator/modulator 55. In the uplink mode, a data memory 56, which contains the most various vehicle data transmits the frequency-modulated data signals to the modulator 55 via an FSK generator 57. In the uplink mode, the stationary unit 21 first transmits an unmodulated carrier signal (CW carrier), which is received by the antenna 1. This carrier signal is modulated with the signal of the FSK generator 57 and is transmitted back again as a frequency-modulated signal (FSK) to the stationary unit 21 via the antenna 1. Since at least two stationary units 21 transmit an unmodulated signal simultaneously and synchronously, but at different carrier frequencies, both carrier frequencies are modulated in the modulator 55 with the FSK signal and are transmitted back to both Stationary units 21.

In the downlink mode, both stationary units 21 transmit the same data synchronously, but again at different carrier frequencies, to the vehicle unit 23. The antenna 1 then receives both modulated carrier frequencies, which are heterodyned at the reception site. In that case, the assumption is that at the data rates used, and with the limited range involved, no errors from transit time differences will occur. The heterodyned wave fields produce a beat, which from the difference between the two stationary units at the frequencies given is at 5 MHz. If there are more than one stationary unit 21, then there are also multiple frequencies of 5 MHz in the beat.

The beat can be filtered out in the filter 54 following the demodulator 55, so that in comparison with a single transmitting stationary unit 21, a higher useful level is available. Moreover, the filter 54 improves the signal-to-noise performance of the receiver. The filter 54 has low-pass or bandpass performance. The upper limit frequency of this filtration depends on the maximum data rate to be transmitted. It is currently assumed that the maximum data rate is between 1 megabit per second and 2 megabits per second. With the frequency modulation ASK used, an upper limit frequency of the filtering of markedly less than 5 MHz is then possible. For the above-described beat, this filter exhibits integrating behavior and thus smooths the course of the signal over time. Since each of the signals delivered to the various stationary units 21 contributes to increasing the signal-to-noise ratio, the reliability of data transmission is thus improved.

Figure 6:
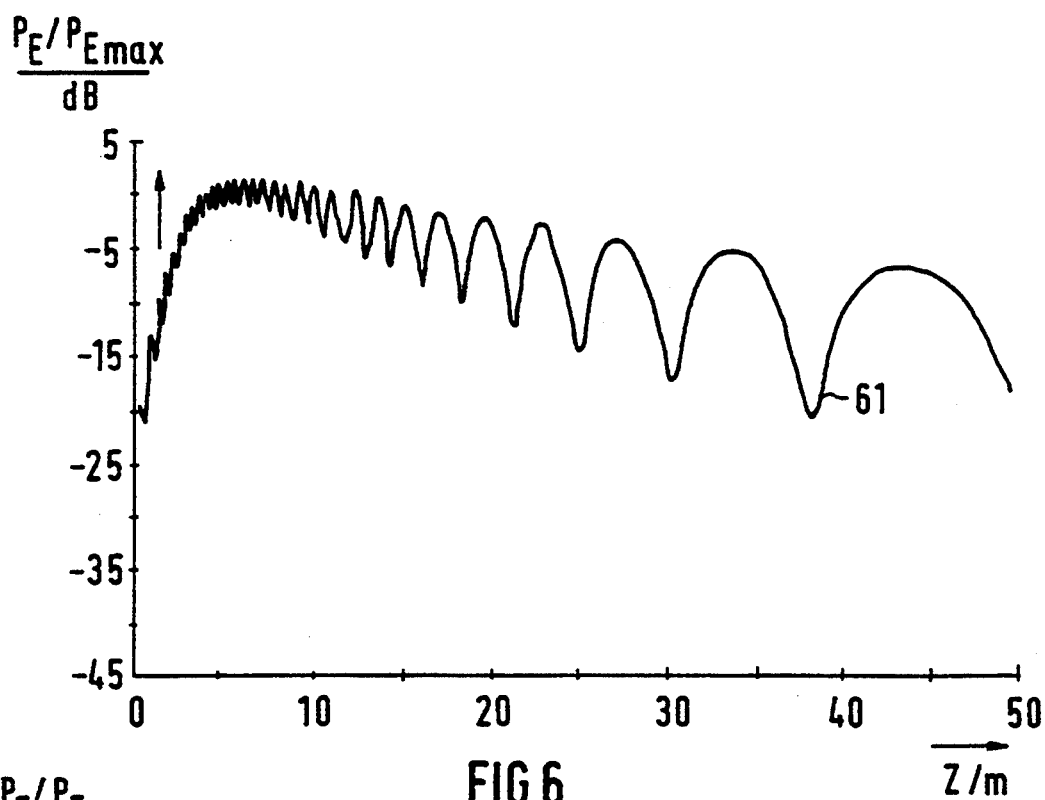
FIGS. 6–8 are diagrams for the standardized reception power.

The mode of operation of the system will now be described. First, FIG. 6 shows a first diagram, in which the standardized reception power at the vehicle unit 23 is plotted with respect to the distance from a stationary unit 21. Strong reflections from the roadway cause the received curve 61 to be very wavy. This means that if the distance from the stationary unit 21 is changed slightly, the standardized reception power fluctuates very markedly. The curve shown is typical for a single unit 21 that is located on the edge of the road.

Figure 7:
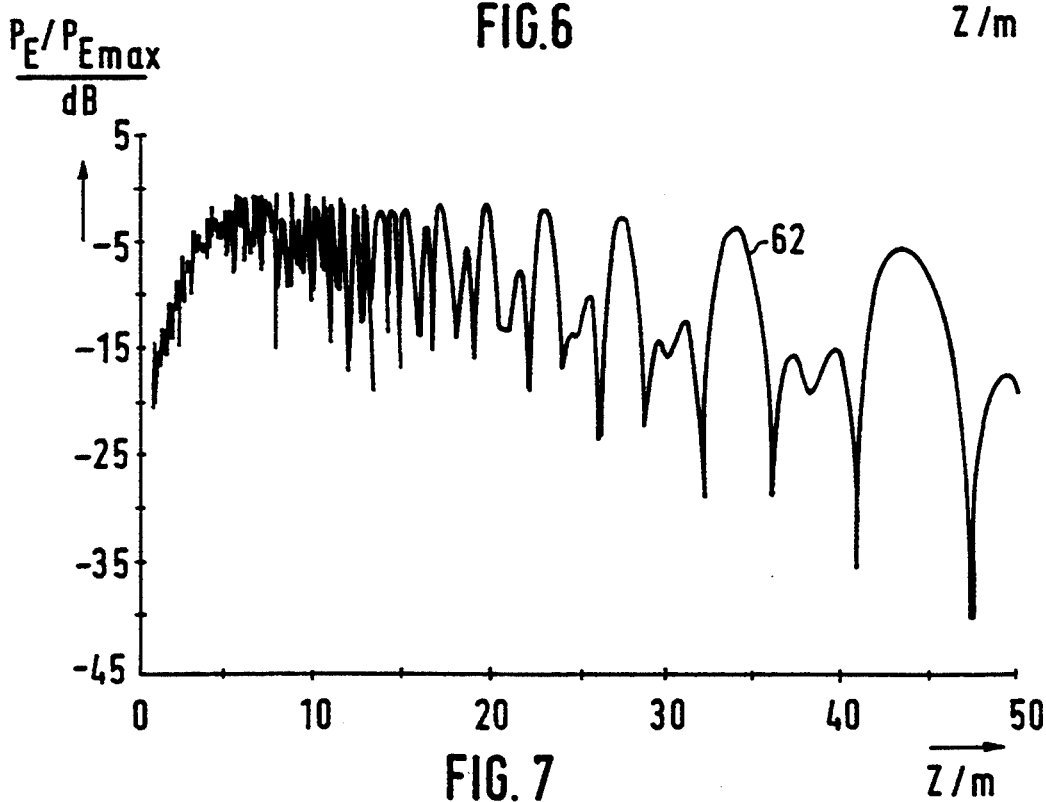

The diagram of FIG. 7 is for an arrangement of two stationary units to the right and left of a road. Both units 21 operate at the same carrier frequency, however. The curve 62 shows very pronounced field intensity changes, some of them caused by strong ground reflections but others of them also caused by interference resulting from the same carrier frequency.

Figure 8:
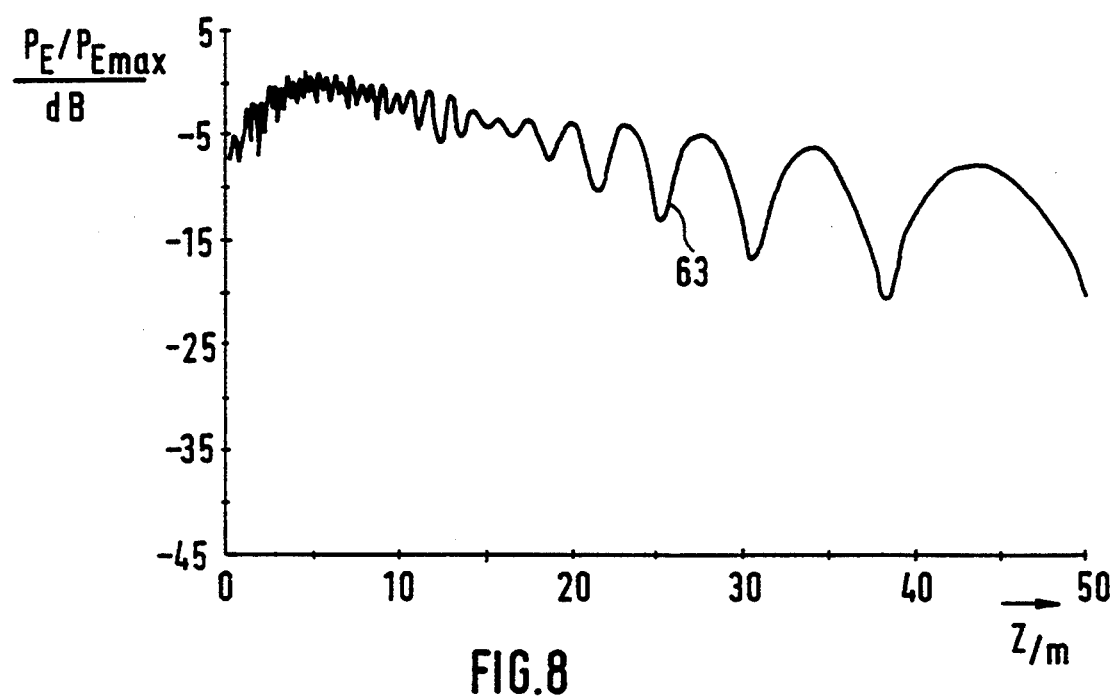

FIG. 8 shows the course of the reception power with two stationary units 21 in accordance with the invention, these units operating at different carrier frequencies. The amplitude changes of the curve 63 are considerably less than in the curve 62 of FIG. 7. The advantage of this arrangement is that if the distance from the stationary units 21 changes slightly, the field intensity changes are relatively slight, so that secured data transmission can also be expected.

In order to assure that the stationary units 21, which after all are spatially separated from one another, will transmit synchronously and will transmit the same data, they are connected to the same data receiver 36 or data transmitter 37. The data transmitter 37 may for instance be a central traffic control computer, which outputs appropriate traffic data to the stationary units 21. The traffic control computer may, however, also be used for detecting charges for road use fees, bridge tolls, and so forth. The data receiver 36 substantially includes a memory, which stores the data signals transmitted by the vehicle in memory, so that they can be further processed in the traffic control computer. For instance, in the case of traffic control, this data may relate to the vehicle type, speed, and so forth. In the case of toll or fee calculation, it is possible to determine whether the fee or toll payment is valid.

In principle, the system of the invention for bidirectional data transmission is independent of the type of modulation, so that a different type of modulation, such as phase modulation, may also be used.

Various changes and modifications may be made, and features described in connection with any one of the embodiments may be used with any of the others, within the scope of the inventive concept.

What is claimed is:

1. A system for bidirectional, electromagnetic transmission of data signals between a plurality of stationary units which have respective effective ranges that at least partially overlap, and a corresponding vehicle unit, wherein the stationary units transmit encoded data signals (ASK) to the vehicle unit (downlink mode), and the vehicle unit transmits encoded data signals (FSK) to the station units by a semi-passive transponder mode, characterized in that at least two stationary units are provided, which operate at predetermined frequency spacings and that in the downlink mode synchronously transmit the same data, and that the reception unit of the vehicle unit is adapted to receive the transmission frequencies of the stationary transmitting units.

2. The system of claim 1, characterized in that the receiving unit of the vehicle unit has at least one antenna, which is formed by stripline technology.

3. The system of claim 1, characterized in that the vehicle unit has a detector diode as its demodulator.

4. The system of claim 1, characterized in that the vehicle unit has a filter with a low-pass characteristic.

5. The system of claim 1, characterized in that the vehicle unit is formed so that in the uplink mode, it modulates each received carrier frequency synchronously with the data signals to be transmitted and transmits it to the stationary units.

6. The system of claim 5, characterized in that the stationary units are connected to a data receiver, which compares the respective received and demodulated data signals of a stationary unit with those of a further stationary unit and rejects data errors that occur.

7. The system of claim 5, characterized in that the data receiver is formed to ascertain data errors by means of a transmission protocol.

8. The system of claim 1, characterized in that the stationary devices encode the data signals in the downlink mode by amplitude modulation, and that the vehicle unit in the uplink mode encodes the carrier frequencies of the stationary units by frequency modulation.

9. The system of claim 1, characterized that it is adapted for use as part of a system for transmitting traffic and navigation data and for debiting road use fees.

10. The system of claim 1, characterized in that the vehicle unit has a filter with a band-pass characteristic.

* * * * *